(12) United States Patent
Braun et al.

(10) Patent No.: US 10,920,846 B2
(45) Date of Patent: Feb. 16, 2021

(54) AIR SPRING

(71) Applicant: ContiTech Luftfedersysteme GmbH, Hannover (DE)

(72) Inventors: Patrik Braun, Hannover (DE); Bernd Moellenbruck, Hannover (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 37 days.

(21) Appl. No.: 15/900,547

(22) Filed: Feb. 20, 2018

(65) Prior Publication Data
US 2018/0172103 A1    Jun. 21, 2018

Related U.S. Application Data

(63) Continuation of application No. PCT/EP2016/060365, filed on May 10, 2016.

(30) Foreign Application Priority Data

Aug. 18, 2015   (DE) .................... 10 2015 215 735.0

(51) Int. Cl.
    *F16F 9/43*     (2006.01)
    *F16F 9/04*     (2006.01)
    (Continued)

(52) U.S. Cl.
    CPC .......... *F16F 9/0454* (2013.01); *A01B 63/002* (2013.01); *B60G 11/28* (2013.01);
    (Continued)

(58) Field of Classification Search
    CPC . B60G 11/28; B60G 2204/126; F16F 9/0454; F16F 9/057
    See application file for complete search history.

(56) References Cited

U.S. PATENT DOCUMENTS 4,453,747 A *  6/1984  Bimba .................. F16L 37/144
                                                    285/238
5,326,082 A    7/1994  Ecktman et al.
(Continued)

FOREIGN PATENT DOCUMENTS

EP     2696095 A1    2/2014

OTHER PUBLICATIONS

International Search Report dated Oct. 10, 2016 of international application PCT/EP2016/060365 on which this application is based.

*Primary Examiner* — Nicholas J Lane
(74) *Attorney, Agent, or Firm* — Gregory Adams; David Cate (57) ABSTRACT

An air spring has an air-spring lobe made of elastomer material, which is clamped at the lobe ends thereof via connection parts between the sprung mass and the unsprung mass and is connected by way of the connection parts to the fastening parts of the sprung and the unsprung mass. The connection parts and the air-spring lobe enclose the working chamber that is under internal pressure and contains the air-spring volume. The working chamber is in connection with at least one air connection provided in the connection parts. At least one of the connection parts is connected to the associated fastening part by a releasable snap-in or latching connection and the snap-in or latching connection includes at least one air connection, to which a feed line or a hose for the compressed air supply is connected.

20 Claims, 6 Drawing Sheets

(51) Int. Cl.
*A01B 63/00* (2006.01)
*B60G 11/28* (2006.01)
*B60N 2/52* (2006.01)
*B62D 33/06* (2006.01)
*F16F 9/05* (2006.01)

(52) U.S. Cl.
CPC ......... *B60N 2/525* (2013.01); *B62D 33/0608* (2013.01); *F16F 9/04* (2013.01); *F16F 9/05* (2013.01); *F16F 9/43* (2013.01); *B60G 2204/126* (2013.01); *B60G 2204/162* (2013.01); *F16F 2230/0005* (2013.01)

(56) References Cited

U.S. PATENT DOCUMENTS

| | | | | |
|---|---|---|---|---|
| 6,247,306 | B1* | 6/2001 | Sonnak | F16F 9/05 |
| | | | | 251/149.2 |
| 6,398,179 | B1* | 6/2002 | Soles | B60G 11/28 |
| | | | | 248/222.51 |
| 6,554,323 | B1* | 4/2003 | Salomon-Bahls | F16L 33/225 |
| | | | | 285/239 |
| 2003/0067103 | A1* | 4/2003 | Easter | B60G 17/0528 |
| | | | | 267/64.28 |
| 2003/0116898 | A1* | 6/2003 | Leonard | F16F 9/0445 |
| | | | | 267/64.27 |
| 2006/0055094 | A1 | 3/2006 | Attinello et al. | |
| 2006/0267257 | A1* | 11/2006 | Leonard | F16L 37/008 |
| | | | | 267/64.21 |
| 2013/0020746 | A1* | 1/2013 | Agarwal | F16F 1/3605 |
| | | | | 267/64.27 |
| 2016/0121682 | A1* | 5/2016 | Leonard | F16F 9/04 |
| | | | | 280/124.161 |

* cited by examiner

AIR SPRING

CROSS REFERENCE TO RELATED APPLICATIONS

This application is a continuation application of international patent application PCT/EP2016/060365, filed May 10, 2016, designating the United States and claiming priority from German application 10 2015 215 735.0, filed Aug. 18, 2015, and the entire content of both applications is incorporated herein by reference.

FIELD OF THE INVENTION

The invention relates to an air spring having an air-spring lobe made of elastomer material, which is clamped at the lobe ends thereof with the aid of connection parts between the sprung mass and the unsprung mass, or between the sprung mass and a surrounding frame, and is connected by way of the connection parts to the fastening parts of the sprung or unsprung mass, wherein the connection parts and the air-spring lobe enclose the working chamber that is under internal pressure and contains the air-spring volume, and the working chamber is in connection with at least one air connection provided in the connection parts.

BACKGROUND OF THE INVENTION

Air springs of this type are extensively known in the prior art and are used in particular in vehicles, here in trucks and similarly in relatively large passenger cars, for various spring-mounting tasks. Such air springs are usually used in suspension systems, but also for the spring mounting of driver's seats in commercial vehicles and for the spring mounting of cabs/driver's cabs with respect to the vehicle frame.

In particular in the case of driver's seats, cab mounting systems and axle applications, such air springs are often provided with a bayonet locking mechanism on the air-spring cover for easy mounting. This robust, simple locking mechanism dispenses with the need for fastening via screws.

The air springs are connected to an air supply, usually by way of hoses and/or air lines. The air is generally supplied by way of a pressure accumulator located in the vehicle, which is filled via a compressor and then provides the supply of air for the individual sprung systems by way of a controller. The air-spring controller is often incorporated in the rest of the vehicle control system.

For the secure and pressure-tight attachment of an air supply hose to the individual air springs, so-called air connection elements are used on the latter in the form of press-in cartridges or barb nipples. These elements are usually located in the air-spring piston or air-spring cover, which today often take the form of plastic injection moldings. In the case of some air springs, also more than one air connection element is used.

In the cases in which air supply hoses/air lines are connected after the installation of the air spring, little space is available for the positioning of the air connections, whether alongside the usual, quite flat-shaped bayonet locking mechanism or whether in the case of air connections in or on the rolling piston. This has the effect that mounting, that is, insertion of the air hose in the cover or piston of the air spring, often proves to be very difficult, since access to the air connection elements is hindered by other components in the vehicle. If, for example, such an air spring is connected to the corresponding complementary receptacle in the driver's seat by a bayonet closure, and this receptacle is located directly under the seat shell, it is simply impossible to mount the air connection subsequently in the region between the air-spring cover and the seat shell. In the cases in which the air supply hoses/air lines are connected before the installation of the air spring, installation is often made even more difficult by the already connected hoses, since the latter of course hinder the manipulation of the assembled component. In both cases, subsequent servicing or subsequent exchange of the hoses is of course extremely laborious.

SUMMARY OF THE INVENTION

It is an object of the invention to provide an air spring which is of such a structural configuration as to allow easy mounting of the air lines even in difficult installation situations and which also manages with the existing methods that have been adopted in the prior art and existing mounting parts.

This object can, for example, be achieved by an air spring including: an air-spring lobe made of elastomer material and having a first end and a second end; a first connection part clamped to the first end of the air-spring lobe; a second connection part clamped to the second end of the air-spring lobe; the air-spring lobe being clamped between a sprung mass and an unsprung mass at corresponding ones of the first end and the second end via corresponding ones of the first connection part and the second connection part and being connected by way of the first connection part and the second connection part to corresponding fastening parts of the sprung mass and the unsprung mass; the first connection part, the second connection part and the air-spring lobe enclosing a work chamber configured to be under internal pressure and containing an air-spring volume; an air connection; the work chamber being in connection with the air connection; at least one of the first connection part and the second connection part being connected to the corresponding fastening part by a releasable snap-in or latching connection; and, the snap-in or latching connection including the air connection which is configured to have a feed line or a hose for compressed air supply connected thereto.

In this case, at least one of the connection parts is connected to the associated fastening part by a releasable snap-in or latching connection, and the snap-in or latching connection as such includes at least one air connection or air connection element, to which a feed line or a hose for the compressed air supply is connected. The integration of air connection elements in the snap-in or latching connection makes it possible that installation space that is available for the locking mechanism can also be used for the air supply. As a result, the mounting of the air supply hose can be performed after the mounting of the air spring in areas that are more easily accessible.

The snap-in or latching connection between the connection part and the fastening part is preferably formed as a bayonet closure, so that the mounting sequences and moving sequences are in principle the same as those known from the prior art in the corresponding plants. The parts are in this case connected and correspondingly released again in a known way simply by being inserted into one another and turned with respect to one another.

A further advantageous configuration is that the air connection is formed as a plug-in connection or plug-in coupling or as part of a plug-in connection or plug-in coupling, the complementary part of which is located on the feed line or on the hose. In particular with an embodiment in which the air connection has an air connection element that is arranged as a bushing or plug-in cartridge in the snap-in or latching connection or in the bayonet closure, not only is mounting in the vehicle simplified and servicing and maintenance facilitated, but also easier production is made possible, in which only the bushing or plug-in cartridge is produced, for example as a precision, closely toleranced machined part, and it is not necessary for the entire air-spring cover to be worked.

To increase the vibrational comfort, containers with an additional volume for air as the spring medium are often also connected to the air spring. An advantageous embodiment of the invention is that the snap-in or latching connection has a number of air connections, preferably an air connection for filling and venting the working chamber and an air connection for connecting the working chamber to an additional volume or further spring volumes.

It is advantageous for optimal functioning if these additional volume containers are connected to the air spring by a hose of a relatively great diameter. These applications are served in particular by a further advantageous embodiment which includes that the snap-in or latching connection has a number of different air connections or air connection elements, wherein the air connections or air connection elements have different dimensions and/or different embodiments for the connection to feed lines or hoses. This allows different air connection diameters to be realized in an easy way.

Such an air spring can be used particularly advantageously for the mounting or spring mounting of a driver's seat in a vehicle or a driver's cab in a vehicle frame, since here the installation conditions are often particularly confined.

A further advantageous application of such an air spring is its use as an actuator in undercarriages of agricultural equipment or machines, here in particular as an actuator that presses the wheels of an agricultural vehicle onto the ground to varying degrees of intensity. An example of this is the use of such an air spring in a seed drill with a multiplicity of wheels, which for purposes of optimum load distribution are kept in contact with the ground by air springs according to the invention arranged as actuators at the wheels or in the undercarriage. This is so because in such cases of use the available installation space is a criterion that is just as important as the subsequent easy accessibility of such elements during servicing and maintenance.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
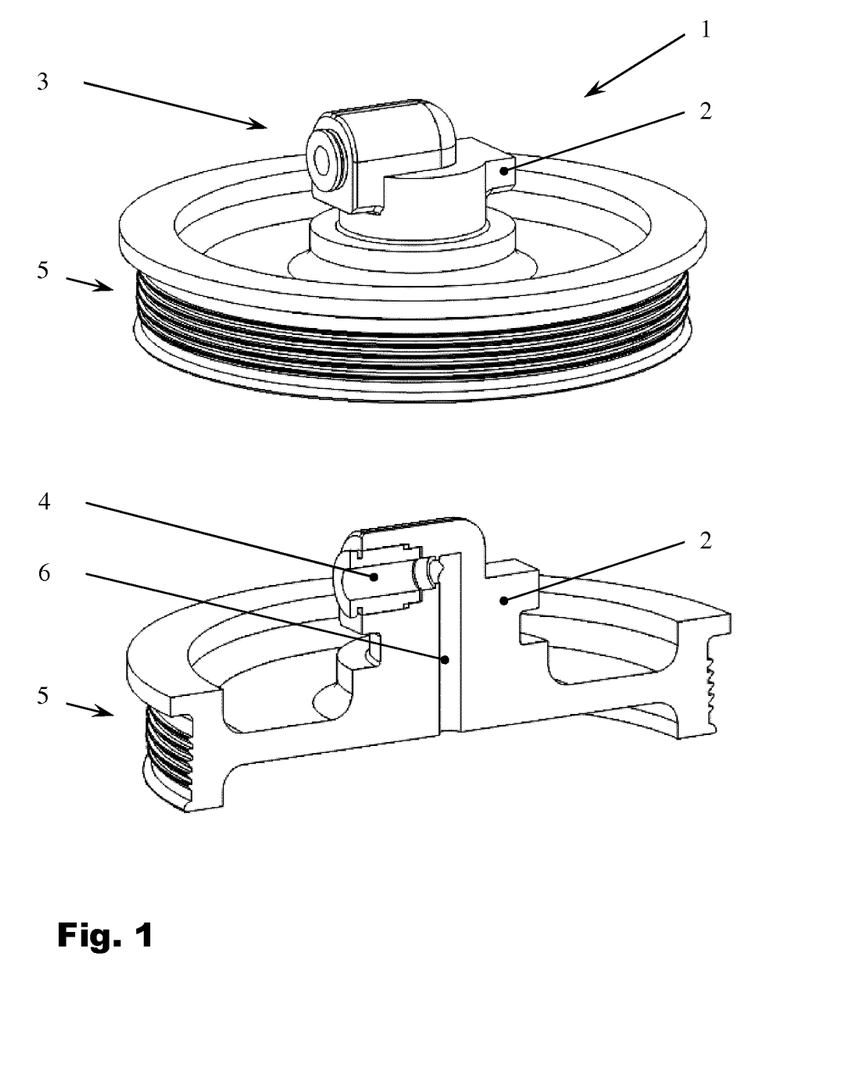
FIG. 1 shows an upper connection part of an air spring according to the invention with an air connection integrated in a bayonet closure.

FIG. 1 shows an upper connection part 1, to be specific the cover/air-spring cover of an air spring for a seat suspension, A perspective view is shown in the upper part of FIG. 1, while this perspective view can be seen in a sectional representation in the lower part of FIG. 1. The same types of representation can likewise be found in FIGS. 2, 3 and 4. The seat air spring is connected with the aid of this connection part 1/air-spring cover to a sprung mass that is not represented here in any more detail, to be specific a seat.

The connection part or the air-spring cover is connected to the associated fastening part on the seat by a releasable latching connection, here a bayonet closure 2. In this case, the connection part/air-spring cover 1 and the fastening part are easily connected by being inserted into one another and turned with respect to one another. The bayonet closure 2 has an integrated air connection 3, to which a feed line that is not represented here in any more detail is connected for the compressed-air supply of the air spring.

The air connection 3 is formed as part of a plug-in coupling, to be specific as the sleeve end of a plug-in coupling, and has an air connection element 4, which as a plug-in cartridge is arranged in the bayonet closure 2, a so-called hose plug-in cartridge. The complementary part, that is, the insertion end, is located at an end that is not represented in any more detail here of a hose for the air feed line.

The connection part 1 has a profiled peripheral region 5, to which the air-spring lobe not represented in this figure is fastened with the aid of clamping rings. The air-spring volume that is enclosed by the connection parts and the air-spring lobe and is under internal pressure is in connection with the air connection by way of the channel bore 6 in the upper connection part.

Figure 2:
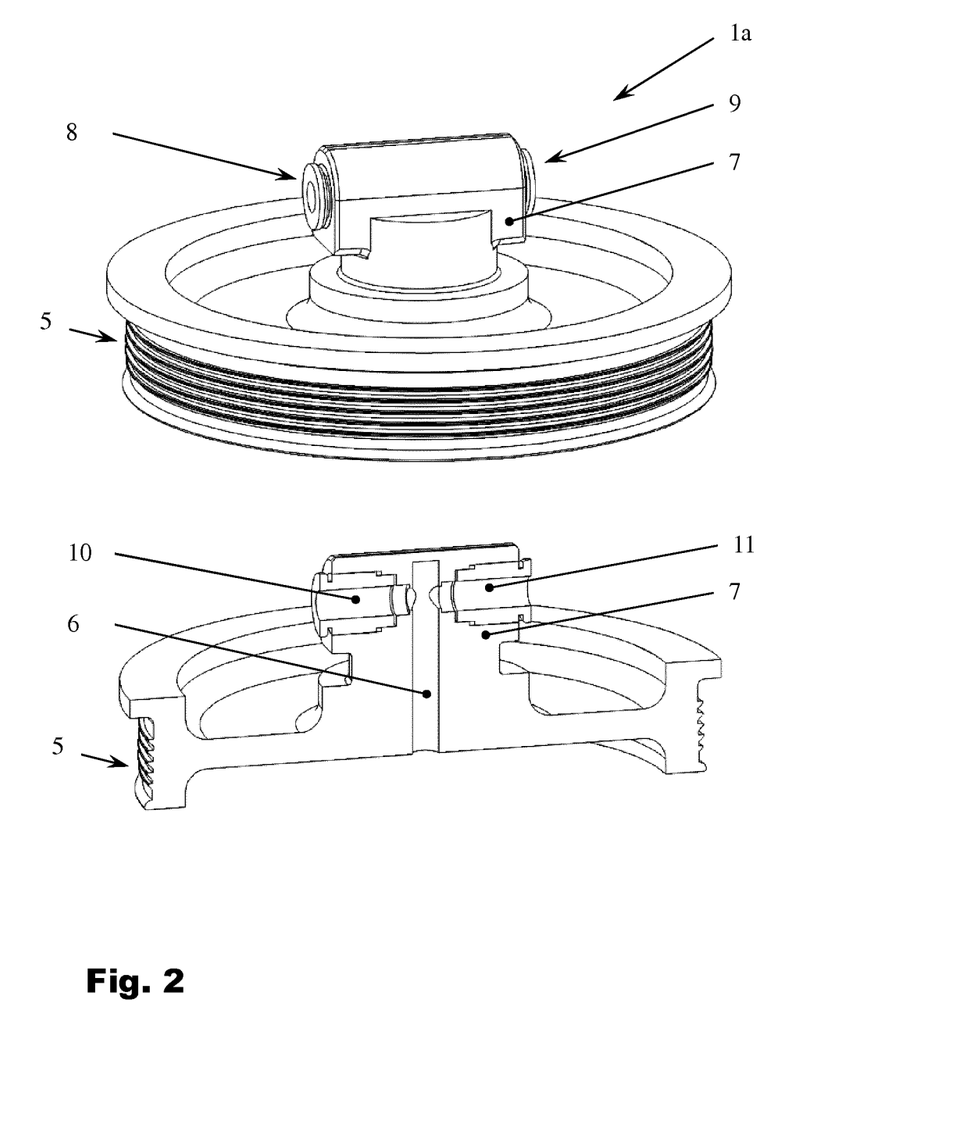
FIG. 2 shows a further configuration of a connection part, in which the bayonet closure has two air connections.

FIG. 2 shows a further embodiment of a connection part 1a, in which the bayonet closure 7 has two air connections 8 and 9, which are in connection with one another and can be connected in parallel by way of the multiple air springs. Otherwise, the type of construction is similar to the type of construction shown in FIG. 1. Here, too, the air connections 8 and 9 are formed as the sleeve end of a plug-in coupling and have air connection elements 10 and 11, which are arranged as hose plug-in cartridges in the bayonet closure 7.

Here, too, there is the profiled peripheral region 5 for fastening an air-spring lobe with the aid of clamping rings and also a channel bore 6 for connecting the working chamber to the air connection. Both air connection elements 10 and 11 are embodied as hose plug-in cartridges of the same dimensions and type of construction.

Figure 3:
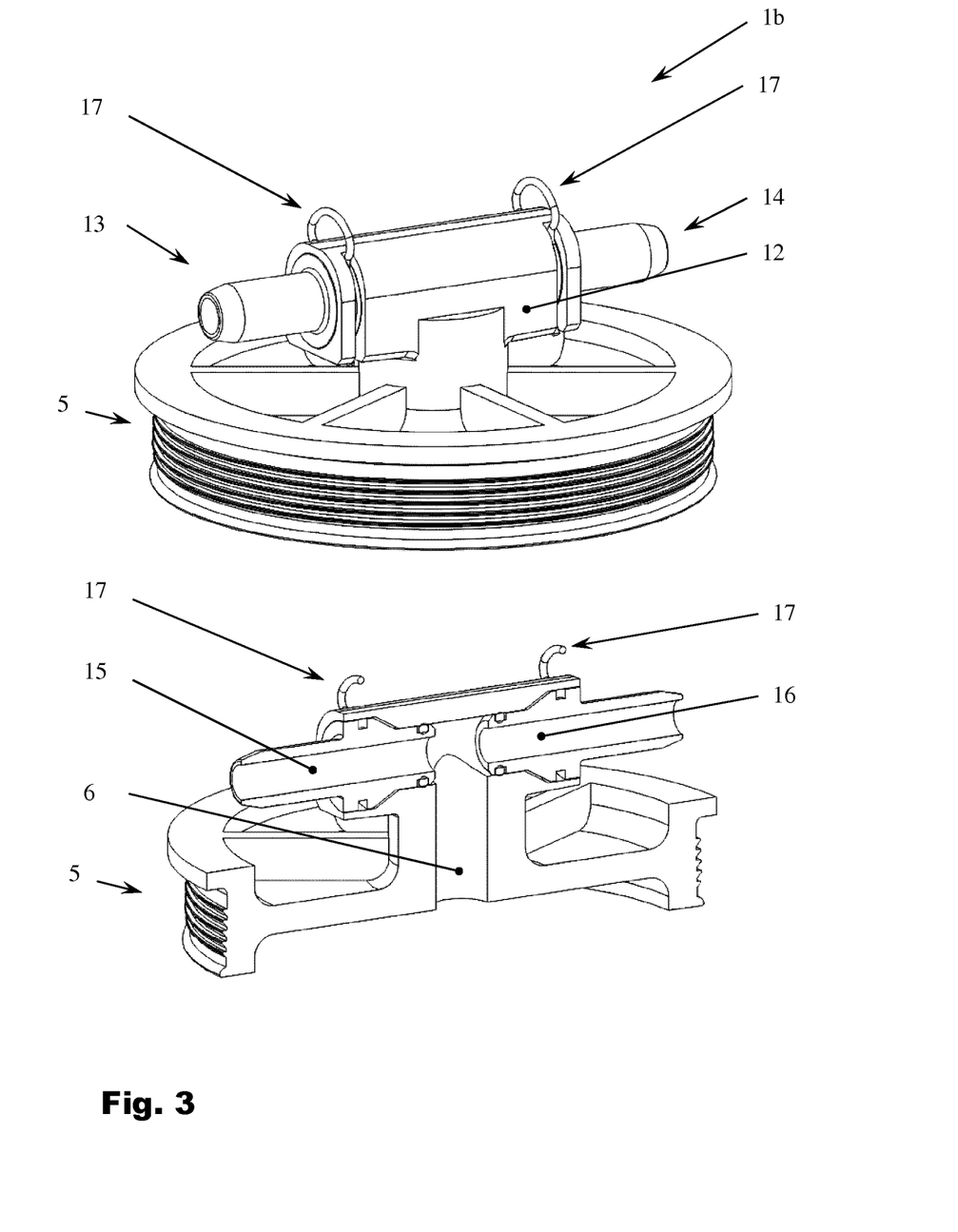
FIG. 3 shows another configuration of a connection part, in which there are two air connections in a bayonet closure.

FIG. 3 shows another embodiment of a connection part 1b, in which there are in a bayonet closure 12 two air connections 13 and 14 embodied in a way similar to the air connections represented in FIG. 2. However, the plug-in connection shown here, formed as a plug-in coupling, has air connection elements 15 and 16, which are fixed by spring clips 17, that is, bent spring wires as fastening clamps.

Figure 4:
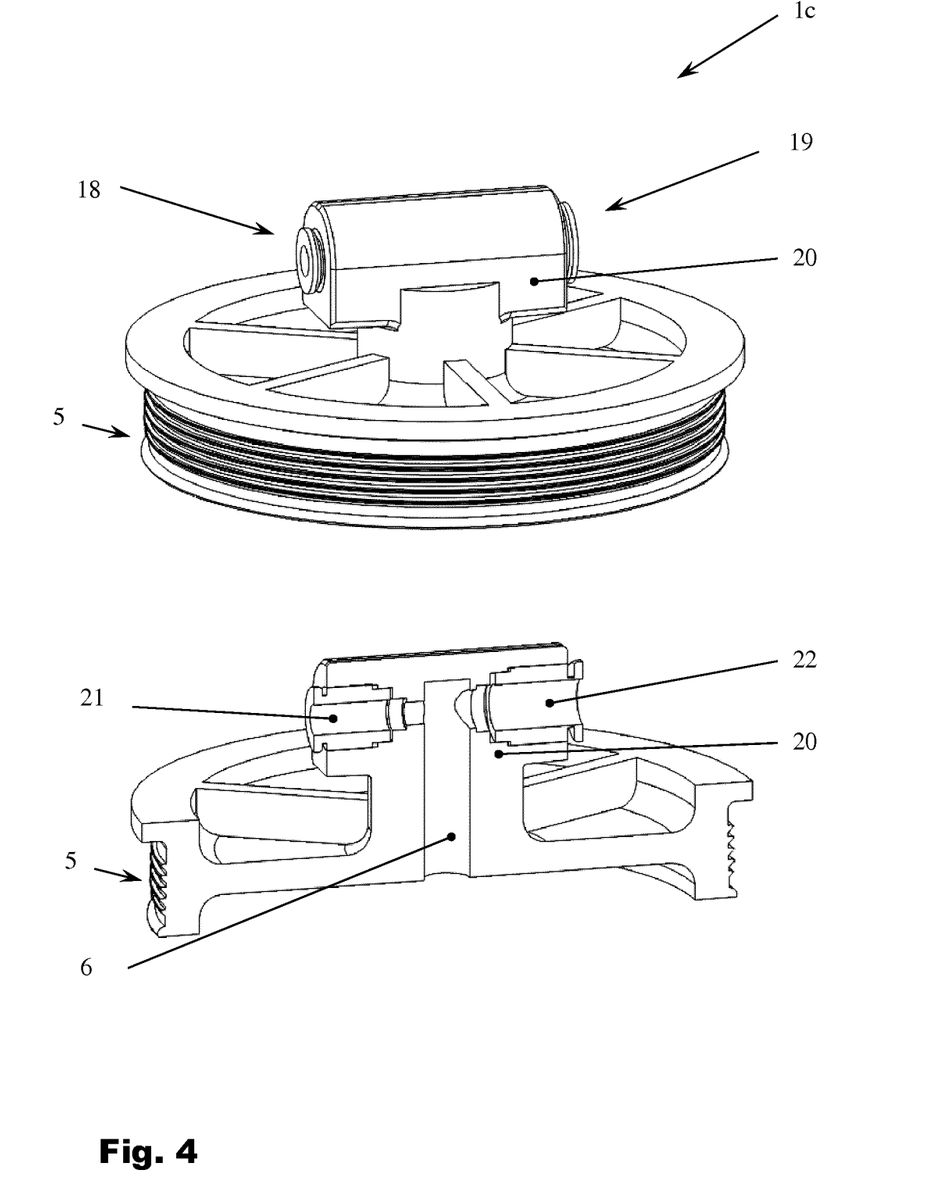
FIG. 4 shows a further configuration of a connection part; in which two air connections of different dimensions are arranged in a bayonet closure; and, FIGS. 5 and 6 show perspective diagrams of an embodiment from the prior art.

FIG. 4 shows a further embodiment of a connection part 1c, in which two air connections 18 and 19 are likewise arranged in a bayonet closure 20, likewise embodied as hose plug-in cartridges 21 and 22 of the same type of construction, but formed with different dimensions.

Figure 5:
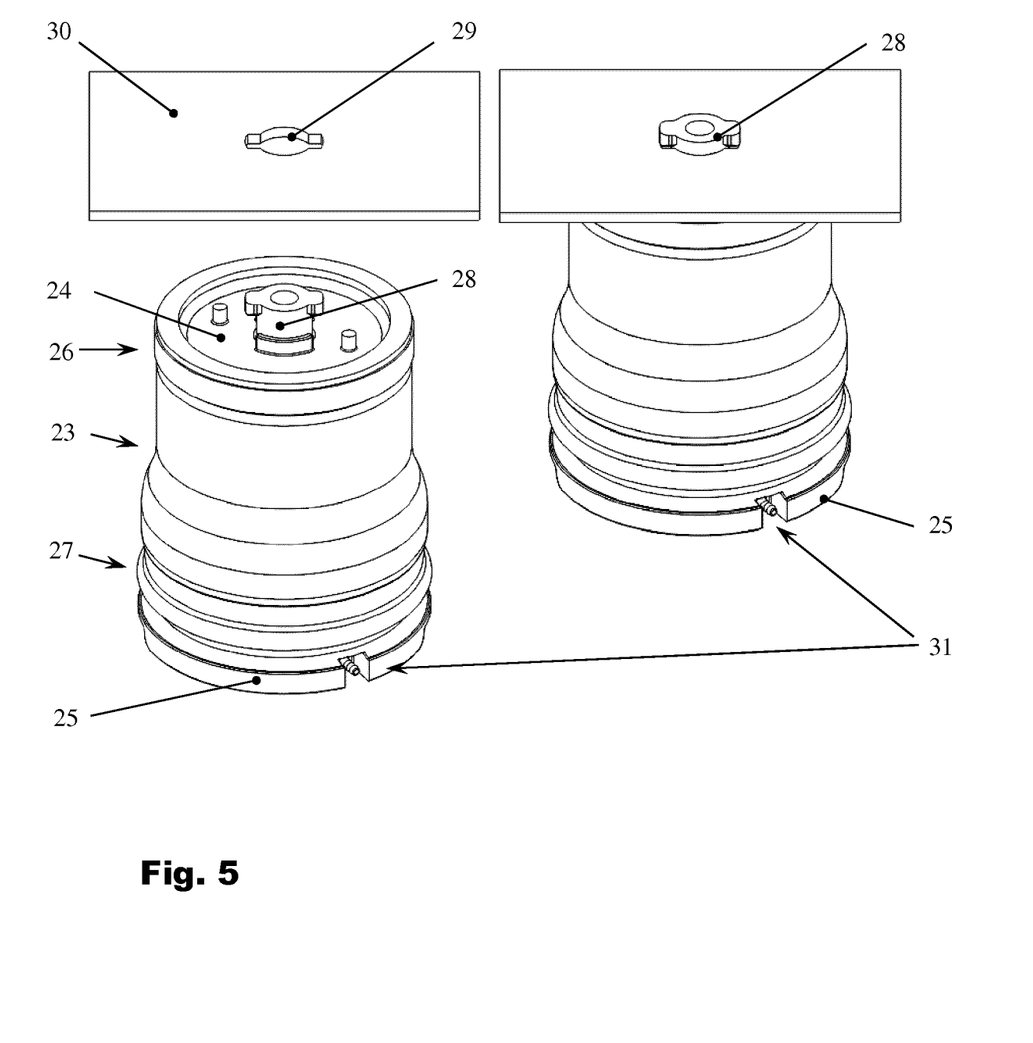
Figure 6:
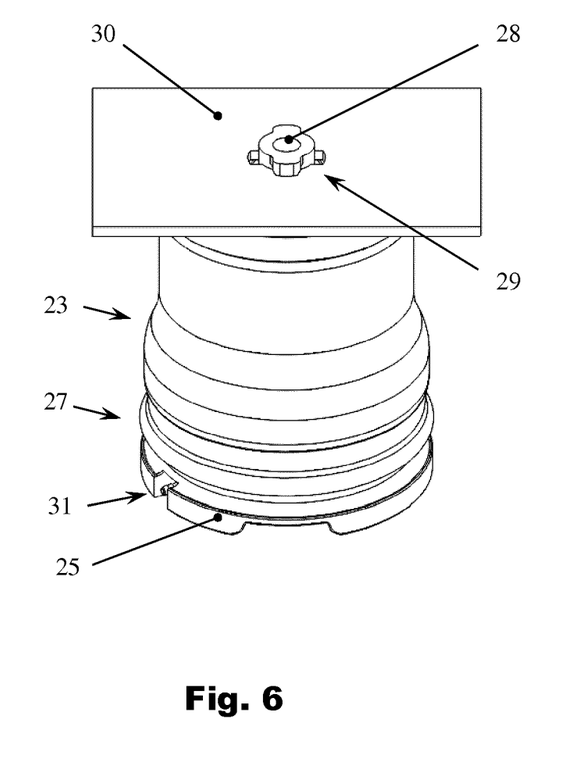

When viewed together, FIGS. 5 and 6 show an embodiment from the prior art, which once again illustrates the principle of a connection of an air spring 23 between a sprung mass and an unsprung mass not represented here in any more detail. The state before mounting is represented on the left in FIG. 5, while the state after mounting can be seen on the right. The air spring 23 is clamped between the upper connection plate/air-spring cover 24 and the air-spring piston 25 with the aid of clamping rings 26 and 27. In FIG. 5 there can clearly be seen the bayonet closure with the mounting pin 28, which is inserted through the clearance 29 in the fastening plate 30 or the fastening part on the seat, then, as shown in FIG. 6, turned by 90° and usually then fastened on the piston side. The bayonet wings of the mounting pin then lie against the fastening plate and tensile forces can also be transferred to the fastening plate. In such embodiments that are known in the prior art, the air connection 31 is usually attached at the lower end of the air-spring piston.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the Description 1, 1a, 1b, 1c Connection part
2 Bayonet closure
3 Air connection
4 Air connection element
5 Profiled peripheral region
6 Channel bore
7 Bayonet closure
8 Air connection
9 Air connection
10 Air connection element
11 Air connection element
12 Bayonet closure
13 Air connection
14 Air connection
15 Air connection element
16 Air connection element
17 Spring clip
18 Air connection
19 Air connection
20 Bayonet closure
21 Hose plug-in cartridge
22 Hose plug-in cartridge
23 Air spring
24 Air-spring cover (upper connection part)
25 Air-spring piston (lower connection part)
26 Clamping ring
27 Clamping ring
28 Mounting pin
29 Clearance
30 Fastening plate
31 Air connection

What is claimed is:

1. An air spring comprising:
an air-spring lobe made of elastomer material and having a first end and a second end;
a connection part clamped to said first end of said air-spring lobe and having a bayonet connection, wherein the bayonet connection includes an air connection, wherein the bayonet connection has a T-shaped overhang above the first end of the air-spring lobe and includes a first overhanging end and a second overhanging end of the T-shaped overhang and an opening for the air connection is located on the first overhanging end of the T-shaped overhang,
said air-spring lobe clamped defining a work chamber configured to be under internal pressure and containing an air-spring volume;
said work chamber being in connection with said air connection; and
said air connection configured to receive an air supply.

2. The air spring of claim 1, wherein said bayonet connection is formed as a bayonet closure.

3. The air spring of claim 1, wherein said bayonet connection has an additional air connection.

4. The air spring of claim 1, wherein said bayonet connection has a first air connection element configured to fill and vent said work chamber by way of a channel bore and a second air connection element configured to connect said work chamber to an additional volume or a further spring volumes.

5. The air spring of claim 1, wherein said air connection is associated with a complementary part located on the feed line or on the hose.

6. The air spring of claim 3, wherein said additional air connection has an air connection element arranged as a plug-in cartridge.

7. The air spring of claim 2, wherein said air connection has an air connection element arranged as a bushing or plug-in cartridge in said bayonet closure.

8. The air spring of claim 1, wherein:
said bayonet connection has an additional air connection; and,
said additional air connection and the air connection have different dimensions for a connection to feed lines or hoses.

9. The air spring of claim 6, wherein:
said bayonet connection has a different air connection and a different air connection element; and,
the different air connection element has at least one of different dimensions and different embodiments for the connection to feed lines or hoses.

10. The air spring of claim 1, wherein the air spring is configured for mounting or spring mounting a driver's seat in a vehicle using the bayonet connection.

11. The air spring of claim 1, wherein the air spring is configured for mounting or spring mounting a driver's cab in a vehicle frame.

12. The air spring of claim 1, wherein the air spring is configured as a sprung actuator for the undercarriage of agricultural equipment.

13. The air spring of claim 1, wherein the received air supply is provide by a feedline or hose.

14. The air spring of claim 1, further comprising a second connection part clamped to the second end of the air-spring lobe.

15. The air spring of claim 1, wherein the air connection is above a pin of the bayonet connection.

16. The air spring of claim 1, wherein the T-shaped overhang comprises a spring clip configured to secure an air element to the air connection.

17. The air spring of claim 16, wherein the air element is connected to a feed hose that supplies the air supply.

18. The air spring of claim 1, further comprising a second air connection having an opening on the second end of the T-shaped overhang.

19. The air spring of claim 18, wherein the top side of the T-shaped overhang is above the air connection and the second air connection.

20. The air spring of claim 19, wherein a surface of the top side is orthogonal to surfaces of the first and second ends of the T-shaped overhang.

* * * * *